US005918654A

United States Patent [19]
Bossut

[11] Patent Number: 5,918,654
[45] Date of Patent: Jul. 6, 1999

[54] TIRE INCLUDING TREAD WITH INCISIONS

[75] Inventor: Michel Bossut, Cebazat, France

[73] Assignee: Compagnie Generale des Establisse-Ments Michelin-Michelin & Cie, Clemont-Ferrand Cedex 01, France

[21] Appl. No.: 08/789,656

[22] Filed: Jan. 27, 1997

[30] Foreign Application Priority Data

Jan. 30, 1996 [FR] France ................................ 96 01254

[51] Int. Cl.⁶ .................................................. B60C 11/12
[52] U.S. Cl. .............................. 152/209.14; 152/209.18; 152/209.25; 152/209.27
[58] Field of Search ........................... 152/209 R, 209 D, 152/DIG. 3

[56] References Cited

U.S. PATENT DOCUMENTS

| | | | |
|---|---|---|---|
| 2,104,532 | 1/1938 | Sommer | 152/209 R |
| 2,109,691 | 3/1938 | Ayguesvives | 152/DIG. 3 |
| 2,926,715 | 3/1960 | Constantakis | 152/209 R |
| 5,316,062 | 5/1994 | Lurois | 152/DIG. 3 |

FOREIGN PATENT DOCUMENTS

| | | | |
|---|---|---|---|
| 379854 | 8/1990 | European Pat. Off. | 152/209 R |
| 58-194605 | 11/1983 | Japan | 152/209 D |
| 2-53611 | 2/1990 | Japan | 152/209 R |
| 7-228106 | 8/1995 | Japan | 152/209 R |
| 518601 | 3/1940 | United Kingdom | 152/209 R |
| 727207 | 3/1995 | United Kingdom . | |

OTHER PUBLICATIONS

Translation of Japan 58–194605.
Blow, *Rubber Technology and Manufacture*, pp. 349–356 1971.

*Primary Examiner*—Steven D. Maki
*Attorney, Agent, or Firm*—Baker & Botts, L.L.P.

[57] ABSTRACT

A tread (5) of a tire (1) which has a carcass reinforcement (2) and is reinforced by a reinforcement belt (3), the tread, comprising a so-called rolling surface (6), being divided into at least one circumferential strip. Each defined circumferential strip is provided with a plurality of incisions (71) of small length in transverse direction. On each defined circumferential strip a circumferential notching ratio is defined which makes it possible to reduce the amount of energy dissipated by deformation upon the rolling of the tire.

7 Claims, 2 Drawing Sheets

TIRE INCLUDING TREAD WITH INCISIONS

BACKGROUND OF THE INVENTION

The present invention relates to treads of tires having a carcass reinforcement surmounted by a crown reinforcement belt.

The problem of reducing the energy consumption of a vehicle is an important one and frequently is controlling in the development and sale of certain tires. The solution to this problem requires the production of tires which have a reduced resistance to rolling.

It is known that the resistance to rolling of a tire on a road surface is related to losses of energy in said tire which are in part dependent on the hysteresis characteristics of the rubber mixes employed, particularly those forming the tread and in part dependent on the deformation cycles experienced by said mixes during the rolling of the tire.

One possibility for reducing losses of energy of a rolling tire concerns reduction of the energy losses resulting from the hysteresis characteristics of the rubber mixtures employed, and particularly of the mixtures constituting the tread.

Another possibility for the reduction of the energy losses concerns the manner in which the tread is provided with cuts in the form of notches and/or incisions, in order to form a tread pattern.

In fact, if one examines the tread of a tire inflated to a pressure corresponding to its pressure of use and supporting a given load it is found that said tread has a surface, known as the rolling surface, located radially to the outside of the tire, which, outside of the zone of contact with the ground, can be characterized as a surface of double radius of curvature, namely curved both in the meridian direction and in the circumferential direction. This surface is characterized by the fact that its intersection with a radial plane, that is to say a plane which contains the axis of rotation of the tire, has a profile which at all points has a meridian radius of curvature other than zero; similarly, and obviously, the intersections of the rolling surface with planes perpendicular to the axis of rotation of the tire correspond to circles the radii of curvature of which are almost identical to the radius of the inflated tire not under load, measured in the equatorial plane. The equatorial plane is the plane perpendicular to the axis of rotation of the tire, passing through the center of the axial width of the tread.

The term "notch", as used herein means any cut produced in the tread and creating two walls facing each other and extending to the tread surface and having a width of at least 2 mm, that is to say the average distance separating the walls of the notch between the mouth and the bottom of the notch is, on the average, 2 mm; by "incision", there is understood a cut of a width of less than 2 mm.

Upon rolling on ground of constant average curvature along a main direction corresponding to the direction of rolling, the rolling surface is deformed in a region called the contact region so as to adopt the geometry of the ground and therefore the principal curvatures of the ground; this contacting therefore results in deformations of the tread. Upon the entry into and departure from the zone of contact with the ground, the tread and its rolling surface pass through two transition zones, located in the vicinity of the contact zone, in which said tread undergoes strong circumferential flexure and is forced to assume a very small radius of curvature in the circumferential direction.

Accordingly, the circumferential flexure deformation cycle undergone by the tread is very important since it impels the outer surface of the tread to pass through very large curvature changes upon entrance into and departure from contact, which surface must assume the average curvature of the ground between these two zones.

By average curvature of the ground, it is understood that the ground on which the tire rolls has a single curvature in the direction of displacement of the tire thereon and that this curvature remains close to a fixed value; a curvature of zero corresponds to a flat ground while to a rolling wheel for the testing of a tire there corresponds a curvature the value of which may be positive or negative depending on whether the ground is concave or convex.

It has been proposed, for instance in French Patent 1 080 845, in order to reduce the amount of energy dissipated by the deformation of the tread upon entrance into and departure from contact, to provide said tread with numerous incisions and/or grooves arranged in transverse or quasi-transverse direction; in this way, the strong flexure upon entrance into and departure from contact is facilitated by the opening of the notches, and thus the energy necessary for the rolling and accordingly the energy consumed by the tire are reduced.

If one considers what happens during the rolling of a tire comprising an unnotched tread, it is noted that, in the zone of contact, the tread is subjected to the action of pressure forces perpendicular to the surface of contact with the ground, which forces counterbalance the load borne by the tire, to the action of shear forces tangent to the surface of contact and directed both longitudinally and transversely, and to internal compression forces resulting from the variation in curvature of said tread. The tangential forces are the direct consequence of the contact between the ground and the rolling surface of the tread of the tire and the existence of rubbing between said surfaces. Under the effect of the compressive forces resulting from the flexure of the tread and taking into account the existence of the forces tangent to the rolling surface, there is produced a deformation of the tread in the direction of the thickness which is equivalent to a thickening of said tread. This deformation in the direction of the thickness of the tread is, in part only, limited by the contact forces acting perpendicular to the rolling surface in the zone of contact and the inflation pressure forces acting within the tire.

On the other hand, in the case of a tread which is extensively notched by numerous cuts so as to produce continuous ribs and/or blocks of rubber, the tread elements thus formed are subjected to the actions of the contact pressures and the inflation pressures and there results from this a compressive deformation along their thickness, which leads to the dissipating of a certain amount of energy upon each cycle, that is to say, upon each passage into contact.

SUMMARY OF THE INVENTION

One purpose of the invention is to decrease the resistance to rolling of a tire by proposing a tread pattern which, while facilitating the flexion of said tread upon entrance into and departure from contact, at the same time makes it possible to reduce as much as possible the deformations of said tread in its thickness over a great part of the contact zone.

For this purpose, there is proposed a tread for a tire which comprises a carcass reinforcement and a reinforcement belt, the tread comprising a so-called rolling surface intended to come into contact with the ground. The tread is divided in axial direction into at least one strip extending in the circumferential direction defined between the ends of the tread or between circumferential grooves or by a circumferential groove and the end of the tread and over the rolling surface of each defined circumferential strip there is produced a plurality of incisions of substantially transverse general orientation distributed quasi-uniformly in circumferential direction, each incision having, on the rolling surface of the new tire, an average width greater than zero and at most equal to 2 mm so as to define on each defined circumferential strip an average circumferential notch ratio Tci, which expresses the ratio of the surface of the transverse incisions present in said circumferential strip to the total surface of said strip.

By surface of an incision there is to be understood the value of the rolling surface of the strip defined by the edges of said incision and the edges of said strip.

A distribution is said to be quasi-uniform when the total number of incisions in the contact zone is on the average constant whatever the portion of the tread passing through said zone.

On the tire inflated to its pressure of use and on each defined circumferential strip there is defined an average radius of circumferential curvature Rci and an average radius of transverse curvature Rti, which are obtained as the radii measured on the rolling surface in the median part of each defined circumferential strip. Each defined strip has an average thickness Ei measured between an outer surface intended to become the rolling surface and an inner surface intended to be in contact with the outside of the reinforcement belt when the tread is on a tire.

It has been found that, by proper selection of the value Tci as a function of Ei and Rci, one can see to it that all the transverse incisions located in the contact zone close so as to absorb the compressive deformation of each defined strip in said contact zone resulting from the variation in circumferential curvature.

In accordance with one interesting embodiment, the tread thus defined is characterized by the fact that on the rolling surface of each defined circumferential strip, the circumferential notch ratio Tci is between 0.9 to 2 times the value of the expression Ei/Rci, representing the compressive deformation of the defined strip measured upon passage into the contact zone.

An incision is said to be closed when the walls of said incision are in contact over practically their entire surface.

The circumferential notch ratio is preferably selected in such a manner as to be between 0.9 and 1.1 times the value of the expression Ei/Rci.

One advantage of a tread developed in accordance with the invention resides in the fact that one combines both the beneficial effect resulting from the presence of transverse incisions on the strong flexures of the tread upon entering into and departing from the contact zone and the fact that in this contact zone the facing walls of each incision come into contact so that the tread does not suffer either a decrease or an increase in its thickness. The notch ratio of each defined circumferential strip is selected in such a manner that the total amount of the spaces created by the incisions compensates for the variation in circumferential length of the rolling surface resulting from the variation in curvature of said surface in the contact zone.

Each circumferential strip has, in fact, a circumferential notch rate which is directly related to the variation in average circumferential curvature which is experienced by said circumferential strip upon passing into the contact zone.

As a general rule, if the circumferential notch ratio Tci is less than 0.9 times the value of the expression Ei/Rci, this means that the variation in longitudinal length of the rolling surface on the circumferential tread in question, resulting from passage into the contact zone, is greater than what the mere closing of the transverse incisions can absorb and in such case compression takes place in circumferential direction which causes a thickening of the tread leading to a loss of energy by hysteresis.

When the circumferential notch ratio Tci is greater than twice the value of the expression Ei/Rci, the incisions do not close completely in the contact zone and therefore it is not possible to prevent the crushing of the tread under the action of the forces perpendicular to the rolling surface, which leads to a decrease in the thickness of said tread and therefore to a loss of energy by hysteresis.

The advantage of such a distribution of transverse incisions will be retained in part in the case of a tread comprising one or more circumferential notches of a width much greater than the width of the incisions. These circumferential notches define, in axial direction, the different strips. The effect of the presence of the incisions in accordance with the invention on the decrease in the resistance to rolling will be decreased, but the equilibrium of the performances of the tire can thus be maintained, in particular on dry ground and wet ground.

The fact that, due to the wear of the tread, the flexure of said tread in the contact zone decreases may be advantageously taken into account by providing, for instance, a reduction in the circumferential notch ratio as the said tread becomes worn, for instance by producing incisions having cross sections of variable and progressively decreasing width.

The same result can be obtained by seeing to it that the number of incisions decreases with the wear of the tread, for instance by producing on the new tire incisions of different depths, the incisions of the smallest depths being worn away as the tread becomes worn.

It may furthermore be advantageous to combine this first arrangement of the distribution of transverse incisions with a second distribution of circumferential incisions in each circumferential strip forming the tread; in fact, upon passage into the contact zone, the transverse curvature of the rolling surface is cancelled out, which results in a deformation by compression of the tread in the transverse direction. It is then advantageous to effect a second distribution of incisions comprising a plurality of incisions of generally circumferential orientation, of an average width greater than zero and less than 2 mm, measured at the level of the rolling surface of the tire inflated to its pressure of use. On each defined circumferential strip there is defined an average transverse notch ratio Tti equal to the ratio of the surface of the circumferential incisions on said circumferential strip to the total surface of said strip.

It is advantageous for the tread which has both transverse and circumferential incisions to have on each defined circumferential strip an average transverse notching ratio Tti of between 0.6 and 1.2 times the value of the expression Ei/Rti, so that, upon the passage of the rolling surface into contact with the ground, practically all the circumferential incisions are also closed.

DESCRIPTION OF THE DRAWINGS

The invention is illustrated by the drawings which show embodiments which are in no way limitative and in which.

DESCRIPTION OF PREFERRED EMBODIMENTS

Figure 1:
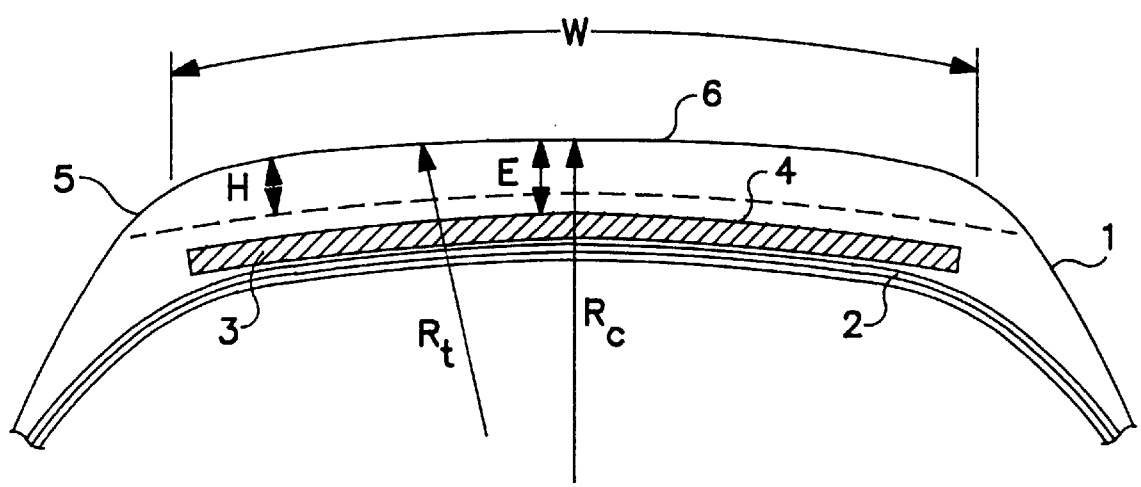
FIG. 1 is a meridian section through a radial carcass tire having a tread provided with a tread pattern in accordance with the invention.

FIG. 1 shows a portion only of a tire 1 of size 125/80 R 18 seen along a meridian section, that is to say along a section plane containing the axis of rotation of said tire. The tire 1 has a radial carcass reinforcement 2 surmounted radially to the outside by a crown reinforcement belt 3. The reinforcement belt 3 has a surface 4 located radially to the outside, on which there is permanently fixed a tread 5 having a rolling surface 6 located radially to the outside and intended to come into contact with the ground. The tread 5 is in this case formed in axial direction of a single circumferential strip of the same width W as the tread 5 corresponding to the effective width of said strip which comes into contact with the road under the effect of the crushing of the tire and the rolling thereof.

The tread 5 has a constant average thickness E=11.5 mm. The thickness E is measured, for instance, at the middle of the width of the tread 5 between the rolling surface 6 of said tread and the radially outer surface 4 of the crown reinforcement belt 3.

The rolling surface 6 is convex, that is to say a segment connecting any two points of the rolling surface 6 is located entirely radially to the inside of said surface 6. The rolling surface 6 has a circumferential radius of curvature Rc=330 mm and a meridian radius of curvature Rt=150 mm, both measured on the median part of the tread of the tire inflated to its rated pressure.

Figure 2:
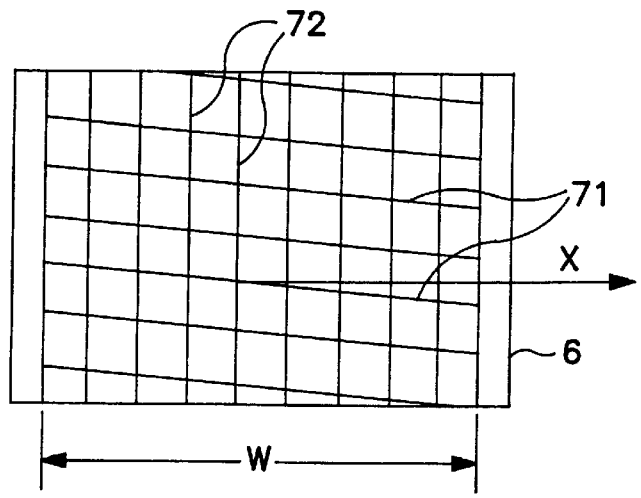
FIG. 2 shows the rolling surface of the tread of the tire corresponding to FIG. 1.

As shown in FIG. 2, the tread 5 is provided with a plurality of incisions 71 of substantially transverse orientation and with a plurality of incisions 72 of circumferential orientation; the incisions 71 form a small angle with the axial direction X, in the present case 5°. The transverse and circumferential incisions all have the same width of 0.5 mm, said width remaining constant over practically the entire depth of said incisions. The transverse and circumferential incisions are uniformly distributed with the same distance apart of 10 mm, which corresponds to a transverse notching ratio of about 5% and a circumferential notching ratio of about 5%.

These values have been determined in such a manner that deformation of the tread 5 upon the rolling of the tire 1 on flat ground is completely absorbed by the closing of the incisions present in the contact zone. The flattening of the tread 5 causes a circumferential deformation of contraction of the rolling surface 6 approximately equal to E/Rc, namely 3.5%, and by a meridian deformation of contraction of said surface 6 approximately equal to E/Rt, namely 7.6%. These deformations lead to the closing of all the incisions present in the contact zone.

It has been found that the production of one to three notches of general circumferential orientation, in the tread pattern of FIGS. 1 and 2 of the invention, makes it possible to obtain good behavior of the tire on wet ground under transverse stress while, however, retaining the major part of the gain in resistance to rolling resulting from the presence of the incisions in accordance with the invention.

In the Table I, given below, there are entered the values, measured at 90 km/hr, of the resistances to rolling of several tires of size 125/80 R 18 inflated to the pressure of 3.5 bars and bearing a load of 400 daN, each tire being distinguished from the others only by its tread pattern. In this Table I, the value of the resistance to rolling of the tire with smooth tread is taken as base reference 100 and a value of less than 100 is to be understood as a lower value of the resistance to rolling.

The different variants of cuts appearing in the Table I are indicated below:

| | |
|---|---|
| Case A: | tire with smooth tread; |
| Case B: | tire the tread of which has a plurality of incisions of zero width distributed in meridian and circumferential direction with a pitch of 10 mm; |
| Case C: | tire the tread of which has, in circumferential direction, incisions of a width of 0.5 mm with a pitch of 10 mm and in meridian direction, alternately, an incision of 0.5 mm followed by an incision of zero width with a pitch of 7.5 mm; |
| Case D: | tire the tread of which has, in circumferential direction, incisions of a width of 0.5 mm with a pitch of 10 mm and in meridian direction, alternately, two incisions of a width of 0.5 mm followed by an incision of zero width with a pitch of 7.5 mm; |
| Case E: | tire the tread of which has, in circumferential direction, incisions of a width of 0.5 mm every 10 mm and in meridian direction incisions of a width of 0.5 mm every 7.5 mm; |
| Case F: | tire the tread of which has, in circumferential direction, incisions of a width of 0.5 mm every 7.5 mm and in meridian direction incisions of a width of 0.5 mm every 7.5 mm. |

| | Circumferential Notch Ratio Tci | Transverse Notch Ratio Tti | Resistance to Rolling at 90 km/hr |
|---|---|---|---|
| Case A | 0 | 0 | Base 100 |
| Case B | 0 | 0 | 98.6 |
| Case C | 3.3% | 5% | 95.9 |
| Case D | 4.4% | 5% | 93.2 |
| Case E | 6.7% | 5% | 93.2 |
| Case F | 7.1% | 7.1% | 97.3 |

It can easily be seen that the decrease in resistance to rolling is greater for values of the transverse and circumferential notch ratios between 3.5% and 7% and between 5% and 7% (Case C; Case D; Case E) while it is smaller when said ratios increase (Case F) or else when the tread is provided only with incision of zero width (Case B).

Figure 3:
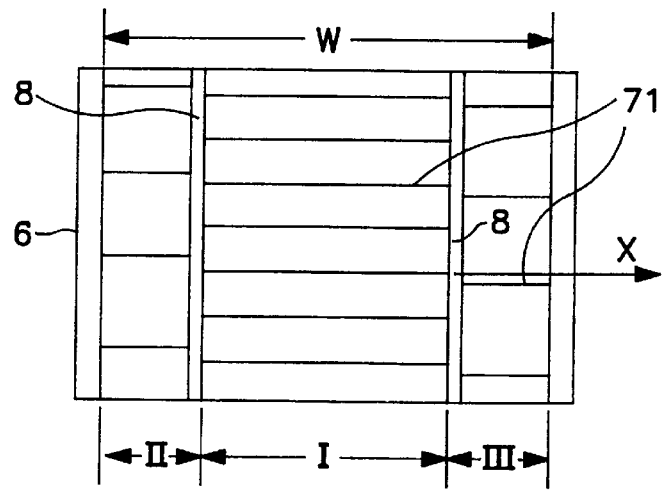
FIG. 3 shows a part of the rolling surface of a tread of a tire in accordance with the invention, said tread being divided into three circumferential strips in the axial direction.

FIG. 3 shows a variant of the invention in which the rolling surface 6 of width W is divided axially into three circumferential strips designated I, II, III which are not all of equal width. The circumferential strip I is in intermediate position and separated from the two other circumferential strips II and III by circumferential notches 8 of a width of 5 mm. Each circumferential strip is provided with transverse incisions 71 of a width of 0.5 mm arranged uniformly in the circumferential direction but with the pitch of the circumferential strip I being half the pitches of the two other strips II and III.

In another tread pattern of a radial tire of size 175/70R13, the tread pattern is formed of three circumferential grooves of widths of 5 mm defining, on the rolling surface in transverse direction, four circumferential strips; the two circumferential strips located on the outer edges of the tread are less wide that the two intermediate circumferential strips located in the central region. On each circumferential strip there is produced a network of incisions of a width of 0.5 mm in transverse and circumferential direction, said incisions being uniformly spaced in both directions by the same pitch of 7 mm.

Figure 4A:
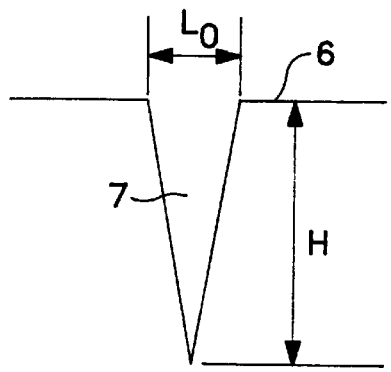
FIG. 4 shows, seen in cross section, various sections of incisions used in combination with the tread pattern of the invention.

In order to optimize the effect on the resistance to rolling of the tread pattern of the invention and to take into account the fact that on each defined circumferential strip the thickness Ei decreases with the wear of the tire, it is advantageous to provide that the transverse and/or circumferential notch ratios of each defined strip decrease proportionally to the worn thickness. For this, it is possible to decrease the number of incisions with the depth and/or to provide incisions the profile of which, seen along a section, are those shown by way of example in FIGS. 4a and 4b. FIG. 4a shows an incision 7 the section through which has the shape of a V, the maximum width $L_0$ of said incision corresponding to the width of the incision measured on the rolling surface of the new tire in inflated state, and the depth H being greater than the permissible maximum worn height, so that it closes almost completely whatever the condition of wear of the tread 5.

Figure 4B:
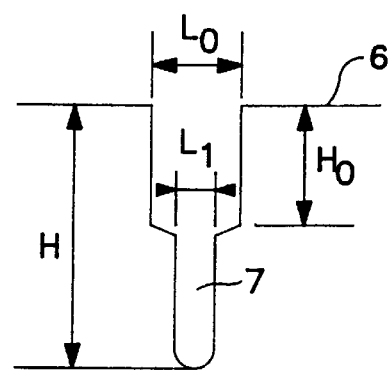

FIG. 4b shows an equivalent embodiment obtained by making an incision 7 having, starting from the rolling surface 6 and over a depth $H_0$, a constant width $L_0$ and then, to the full depth H, a second constant width $L_1$, such that $L_1 < L_0$.

The tread pattern in accordance with the invention can, of course, be combined with the use of a tread formed of a material of low hysteresis loss so as to amplify the beneficial effect on the resistance to rolling of the tire.

The present invention is preferably applied to the case of a tire for a passenger car, said tire having at least one radial carcass reinforcement, that is to say formed of reinforcement elements arranged in the meridian direction of the tire, surmounted by a reinforcement belt, in its turn surmounted by a tread.

I claim:

1. A tire having at least one carcass reinforcement, a reinforcement belt and a tread covering the belt, the tread having a rolling surface intended to come into contact with the ground, said tread being formed, axially, of at least one defined strip extending in circumferential direction being provided, on its rolling surface, with a plurality of incisions of general transverse orientation distributed quasi uniformly in circumferential direction, each incision having, on the rolling surface of the tire when the tire is new, an average width ($L_0$) greater than zero and at most equal to 2 mm so as to define on the rolling surface of each defined circumferential strip an average circumferential notch ratio Tci, expressed as the ratio of the surface of the transverse incisions on the defined strip to the total surface of said strip, each circumferential strip having an average radius of circumferential curvature Rci measured on the rolling surface in the median portion of said circumferential strip, and each defined circumferential strip has an average thickness Ei measured between the rolling surface and an inner surface in contact with the outside of the reinforcement belt, substantially in the median portion of said strip, the tread thus defined is characterized by the fact on each defined circumferential strip:

the circumferential notch ratio Tci is selected as a function of the average thickness Ei and of the average radius of curvature Rci in such a manner that when the rolling surface is in contact with the ground, all the transverse incisions located in the contact zone close under load so as to absorb the compressive deformation of each defined strip in said contact zone resulting from the variation in circumferential curvature and without increasing or decreasing the thickness of the tread, and the circumferential notch ratio Tci is between 0.9 and 1.8 times the value of the expression Ei/Rci for said defined circumferential strip.

2. A tire according to claim 1, characterized by the fact that the circumferential notch ratio Tci is between 0.9 and 1.1 times the value of the expression Ei/Rci.

3. A tire according to claim 1, characterized by the fact that the tread comprises, in addition, a plurality of incisions of generally circumferential orientation having, on the rolling surface of the new tire, an average width other than zero and less than 2 mm, defining, on the rolling surface of each defined circumferential strip a transverse notching ratio Tti expressed as the ratio of the surface of the circumferential incisions on each defined strip to the total surface of said strip, said notch ratio Tti being between 0.6 and 1.2 times the value of Ei/Rti, Rti being the average radius of transverse curvature measured on the rolling surface in the median portion of the defined strip in such a manner that, upon passage of the rolling surface into contact with the ground, the circumferential incisions are closed.

4. A tire according to claim 1, characterized by the fact that the width of the incisions decreases with the depth of said incisions.

5. A tire according to claim 4, characterized by the fact that the width of the incisions decreases proportionally with reduced thickness of said tread due to wear.

6. A tire according to claim 1, characterized by the fact that the number of incisions extending to the rolling surface decreases with the wear of said tread.

7. A tire according to claim 1, characterized by the fact that the carcass reinforcement or reinforcements is/are radial.

* * * * *